(12) United States Patent
Higashikawa et al.

(10) Patent No.: US 11,453,770 B2
(45) Date of Patent: Sep. 27, 2022

(54) RESIN COMPOSITION, FLUORINE-BASED FILM, FLUORINE-BASED LAMINATED FILM, AND LAMINATED MOLDED BODY

(71) Applicant: Mitsubishi Chemical Corporation, Tokyo (JP)

(72) Inventors: Megumi Higashikawa, Tokyo (JP); Koichiro Sanefuji, Tokyo (JP); Junichi Abe, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 464 days.

(21) Appl. No.: 16/573,383

(22) Filed: Sep. 17, 2019

(65) Prior Publication Data

US 2020/0010660 A1 Jan. 9, 2020

Related U.S. Application Data

(63) Continuation of application No. PCT/JP2018/011824, filed on Mar. 23, 2018.

(30) Foreign Application Priority Data

Mar. 23, 2017 (JP) .............. JP2017-056793
Jun. 14, 2017 (JP) .............. JP2017-116992

(51) Int. Cl.
| | | |
|---|---|---|
| *C08L 27/16* | (2006.01) | |
| *B32B 27/08* | (2006.01) | |
| *B32B 27/30* | (2006.01) | |
| *B32B 27/32* | (2006.01) | |
| *C08L 33/06* | (2006.01) | |
| *C08L 33/08* | (2006.01) | |
| *C08L 33/10* | (2006.01) | |
| *B32B 7/04* | (2019.01) | |
| *B32B 7/12* | (2006.01) | |
| *B32B 15/06* | (2006.01) | |
| *B32B 21/04* | (2006.01) | |
| *B32B 21/08* | (2006.01) | |
| *B32B 25/08* | (2006.01) | |
| *B32B 25/12* | (2006.01) | |
| *B32B 21/02* | (2006.01) | |
| *B32B 27/22* | (2006.01) | |
| *B32B 15/18* | (2006.01) | |
| *B32B 27/20* | (2006.01) | |
| *B32B 27/36* | (2006.01) | |
| *B32B 21/14* | (2006.01) | |
| *B32B 27/28* | (2006.01) | |
| *B32B 15/20* | (2006.01) | |

(52) U.S. Cl.
CPC .............. *C08L 27/16* (2013.01); *B32B 27/08* (2013.01); *B32B 27/308* (2013.01); *B32B 27/322* (2013.01); *C08L 33/066* (2013.01); *C08L 33/08* (2013.01); *C08L 33/10* (2013.01); *B32B 2307/408* (2013.01); *C08L 2203/16* (2013.01); *C08L 2205/025* (2013.01)

(58) Field of Classification Search
None
See application file for complete search history.

(56) References Cited

U.S. PATENT DOCUMENTS

| | | |
|---|---|---|
| 2014/0342162 A1 | 11/2014 | Sanefuji et al. |
| 2017/0197394 A1 | 7/2017 | Kawase et al. |

FOREIGN PATENT DOCUMENTS

| | | | |
|---|---|---|---|
| CN | 103930275 | A | 7/2014 |
| EP | 2530118 | A1 | 12/2012 |
| EP | 3170865 | A1 | 5/2017 |
| JP | 2011-231273 | A | 11/2011 |
| JP | 2012-233089 | A | 11/2012 |
| JP | 2015-160874 | A | 9/2015 |
| JP | 2015-203093 | A | 11/2015 |
| WO | 2011/093300 | A1 | 8/2011 |
| WO | 2016/010051 | A1 | 1/2016 |

OTHER PUBLICATIONS

Extended European Search Report issued in corresponding European Patent Application No. 18770847.4 dated Mar. 10, 2020.
Cunningham, "Stop Die Buildup: Die buildup, also called die drool, die bleed, or plate-out, can plague any extrusion process," Plastics Technology, 1-5 (2009).
International Search Report issued in related International Patent Application No. PCT/JP2018/011824 dated Jun. 26, 2018.
Office Action issued in counterpart Chinese Patent Application No. 201880018603.0 dated Mar. 10, 2021.

*Primary Examiner* — Ramsey Zacharia
(74) *Attorney, Agent, or Firm* — Morgan, Lewis & Bockius LLP

(57) ABSTRACT

Provided is a resin composition including 40 to 99% by mass of a fluorine-based resin (A), and 1 to 60% by mass of a matting agent (B), in which a swell ratio as measured under the conditions of a measurement temperature of 230° C., an ambient temperature of 23° C., and a shear rate of 96 (1/sec) is 0.90 to 2.00.

22 Claims, No Drawings

RESIN COMPOSITION, FLUORINE-BASED FILM, FLUORINE-BASED LAMINATED FILM, AND LAMINATED MOLDED BODY

TECHNICAL FIELD

The present invention relates to a resin composition suitable for a matte film, a fluorine-based film, a fluorine-based laminated film, and a laminated molded body using the same.

BACKGROUND ART

A fluorine-based film formed of a fluorine-based resin, which is represented by a vinylidene fluoride-based resin, is excellent in weather resistance, solvent resistance, and contamination resistance, and therefore the fluorine-based film is widely used as a protective film to be laminated on surfaces of various substrates such as plastic, glass, slate, rubber, metal plate, and wood board. The substrates having a surface protected by the fluorine-based film is used for many applications such as interior materials and exterior materials for buildings, furniture, interior materials and exterior materials for automobiles.

In particular, in recent years, luxury appearance has come to be emphasized, and a laminate of fluorine-based matte films has been increasingly used.

For the production method of the matte film, mainly known methods are as follows: (1) a method of thermoforming using a metal or rubber matte roll having a roughened surface to impart fine irregularities on a film surface; (2) a method of spraying fine particles such as sand or metal onto the film surface to impart fine irregularities (sand blasting method); (3) a method of coating a film with a matting agent; and (4) a method of adding a fine organic or inorganic filler (a matting agent) to a film-constituting resin.

In the method (1), there are problems that the matte roll is easily clogged by additives such as an ultraviolet light absorber added to the fluorine-based resin and that in a thin film, thickness unevenness directly cause gloss unevenness and thus a homogeneous matte film is hardly obtained.

In the method (2), there is a problem that the film to be treated is stretched or broken at the time of sand blasting.

In the method (3), since the matting agent is non-adhesive (non-adherent) to the fluorine-based resin, it is difficult to coat the surface of the fluorine-based resin with the matting agent.

When an inorganic-based matting agent is used in the method (4), voids easily occur in the obtained film, and the mechanical strength thereof may thus decrease. Furthermore, the addition of the inorganic-based matting agent may cause a decrease in the transparency of the film.

As a case of using an organic-based matting agent in the method (4), Patent Literature 1 discloses that a vinylidene fluoride-based resin film having a favorable appearance, matting properties, and excellent solvent resistance can be obtained.

CITATION LIST

Patent Literature

Patent Literature 1: International Publication No. WO 2011/093300

SUMMARY OF INVENTION

Technical Problem

However, when the vinylidene fluoride-based resin film is produced by the method disclosed in Patent Literature 1, that is, the vinylidene fluoride-based resin film including an organic-based matting agent is produced by a melt extrusion molding method using a T-die, the resin may be deposited near the discharge opening of the T-die to form accumulation, which is a disadvantageous phenomenon called "die build-up". It is not preferable because when the die build-up occurs, foreign matter or streak-like defects caused by the die build-up occur in the film.

An object of the present invention is to provide a resin composition capable of preventing die build-up at the time of production that results in appearance defects of film and excellent in fine-texture matting properties, transparency, chemical resistance, and stress whitening resistance, a fluorine-based film, a fluorine-based laminated film, and a laminated molded body using the same.

Solution to Problem

As a result of intensive investigations, the present inventors have found that by limiting a swell ratio of a resin composition within a specific range, there can be obtained a resin composition capable of preventing die build-up (accumulation of resin adhering to lip portion of die) at the time of production that results in appearance defects of film and excellent in fine-texture matting properties, transparency, chemical resistance, and stress whitening resistance, a fluorine-based film, a fluorine-based laminated film, and a laminated molded body using the same.

That is, the present invention provides a resin composition described below, a fluorine-based film, a fluorine-based laminated film, and a laminated molded body using the same.

[1] A resin composition including 40 to 99% by mass of a fluorine-based resin (A) and 1 to 60% by mass of a matting agent (B), in which a swell ratio as measured under the conditions of a measurement temperature of 230° C., an ambient temperature of 23° C., and a shear rate of 96 (1/sec) is 0.90 to 2.00.

[2] The resin composition according to [1] further including 0.1 to 40 parts by mass of an acrylic resin (C) with respect to a total of 100 parts by mass of the fluorine-based resin (A) and the matting agent (B).

[3] The resin composition according to [2], in which a mass-average molecular weight of the acrylic resin (C) is 80,000 to 5,000,000.

[4] The resin composition according to [2] or [3], in which the acrylic resin (C) is a polymer not containing a hydroxyl group.

[5] The resin composition according to any one of [2] to [4], in which a MFR ($MFR_{A+C}$) of a melt-kneaded product of the fluorine-based resin (A) and the acrylic resin (C) and a MFR ($MFR_B$) of the matting agent (B) as measured under the conditions of a temperature of 230° C. and a load of 49 N satisfy the following Expression (1).

$MFR_{A+C} - MFR_B \leq 15.0$ g/10 min     Expression (1)

[6] The resin composition according to any one of [1] to [5], in which the fluorine-based resin (A) is polyvinylidene fluoride.

[7] The resin composition according to any one of [1] to [6], in which the fluorine-based resin (A) contains a fluorine-based resin (A1) having a MFR as measured under the conditions of a temperature of 230° C. and a load of 49 N of 15 to 30 g/10 min, and a fluorine-based resin (A2) having a MFR as measured under the same conditions of 1.0 to 14 g/10 min.

[8] The resin composition according to any one of [1] to [7], in which the matting agent (B) is an acrylic matting agent (D).

[9] The resin composition according to [8], in which the acrylic matting agent (D) is a polymer containing a hydroxyl group.

[10] A fluorine-based film including the resin composition according to any one of [1] to [9].

[11] The fluorine-based film according to [10], in which a 60-degree surface gloss of the fluorine-based film is 5 to 70%.

[12] A fluorine-based laminated film, in which the fluorine-based film according to [10] or [11] and an acrylic resin layer (Y) are laminated.

[13] The fluorine-based laminated film according to [12], in which when an initial distance between chucks is set to 25 mm and a test piece is stretched by 10 mm to an end distance between chucks of 35 mm at a tensile speed of 500 mm/min and a temperature of 0° C. in accordance with ISO 527-3, a difference in whiteness ΔW of the test piece between before and after stretching is 10 or less.

[14] The fluorine-based laminated film according to [12] or [13], in which a thickness of the fluorine-based film (X) is 1 to 50 μm.

[15] The fluorine-based laminated film according to any one of [12] to [14] including a pattern layer on at least one surface.

[16] A fluorine-based laminated molded body, in which the fluorine-based laminated film according to any one of [12] to [15] is further laminated on a substrate.

Advantageous Effects of Invention

The present invention enables to provide a resin composition capable of preventing die build-up at the time of production that results in appearance defects of film and excellent in fine-texture matting properties, transparency, chemical resistance, and stress whitening resistance, a fluorine-based film, a fluorine-based laminated film, and a laminated molded body using the same.

DESCRIPTION OF EMBODIMENT

[Resin Composition]

A resin composition of the present invention includes 40 to 99% by mass of a fluorine-based resin (A) and 1 to 60% by mass of a matting agent (B). Here, the total of the resin (A) and the matting agent (B) is 100% by mass.

The contents of the resin (A) and the matting agent (B) in the resin composition are preferably 50 to 99% by mass of the resin (A) and 1 to 50% by mass of the matting agent (B), more preferably 60 to 99% by mass of the resin (A) and 1 to 40% by mass of the matting agent (B), and even more preferably 80 to 98% by mass of the resin (A) and 2 to 20% by mass of the matting agent (B).

When the content of the fluorine-based resin (A) is 40% by mass or more, the chemical resistance of the obtained resin composition is excellent and when the content thereof is 99% by mass or less, production of a film having a matte appearance is enabled.

The resin composition of the present invention preferably further includes 0.1 to 40 parts by mass of an acrylic resin (C) with respect to a total of 100 parts by mass of the resin (A) and the matting agent (B).

The content of the resin (C) in the resin composition is more preferably 1 to 15 parts by mass, even more preferably 1 to 10 parts by mass, and particularly preferably 1 to 8 parts by mass.

When the content of the acrylic resin (C) is 0.1 parts by mass or more, the swell ratio of the blended resin composition increases, and defects at the time of film production such as die lines and die build-up can thus be prevented. Further, when the content is 40 parts by mass or less, the melt tension of the blended resin composition increases, and the film thickness accuracy of the film is thus improved.

Further, the resin composition of the present invention has a swell ratio as measured under the conditions of a measurement temperature of 230° C., an ambient temperature of 23° C., and a shear rate of 96 (1/sec) of 0.90 to 2.00.

The swell ratio is preferably 1.00 to 1.80, and more preferably 1.20 to 1.80.

When the swell ratio is 0.90 or more, a film having a favorable appearance can be obtained without generation of die build-ups at the time of film production. When the swell ratio is 2.00 or less, a film excellent in transparency can be provided.

The swell ratio in the present invention is a value calculated by the following measurement.

The resin composition is placed into a molten state at a temperature condition of 230° C. using a capillary rheometer (manufactured by ROSAND Co., Ltd., orifice diameter φ1 mm, L=10 mm) and then the strand diameter at a position 4.0 cm from the front end portion of the orifice is measured while the resin composition is discharged in the vertical direction at a shear rate of 96 (1/sec), and the swell ratio is calculated from the ratio of the strand diameter to the orifice diameter.

For the resin composition of the present invention, it is preferable that a MFR ($MFR_{A+C}$) of a melt-kneaded product of the resin (A) and the resin (C) and a MFR ($MFR_B$) of the matting agent (B) as measured under the conditions of a temperature of 230° C. and a load of 49 N satisfy the following Expression (1):

$$MFR_{A+C} - MFR_B \leq 15.0 \text{ g/10 min} \qquad \text{Expression (1)}$$

By using a resin composition having such a difference in MFR, the compatibility between the resin (A), the resin (C), and the matting agent (B) is improved, and the gloss stability of the matte film thus obtained is improved.

The resin composition may be blended with a stabilizer, a lubricant, a plasticizer, a foaming agent, a filler, a colorant, an ultraviolet light absorber, a matting agent, a thermoplastic resin, or the like insofar as the range of the present invention is not impaired.

[Fluorine-Based Resin (A)]

Examples of the fluorine-based resin (A) in the present invention include an ethylene-tetrafluoroethylene-based copolymer, polychlorotrifluoroethylene, polytetrafluoroethylene, polyvinyl fluoride, tetrafluoroethylene-hexafluoropropylene copolymer, a tetrafluoroethylene-perfluoro(propyl vinyl ether)-based copolymer, and a vinylidene fluoride-based polymer [for example, polyvinylidene fluoride, a tetrafluoroethylene-vinylidene fluoride copolymer, and a copolymer of vinylidene fluoride and an acrylic monomer such as an alkyl (meth)acrylate ester].

One of these may be used alone or two or more thereof may be used in combination.

As the fluorine-based resin (A), in particular, from the viewpoint of light transmissivity of the fluorine-based film thus obtained, fine-texture matteness developability, and compatibility between the fluorine-based resin (A) and the matting agent (B) described below, vinylidene fluoride-based polymers are preferred.

The vinylidene fluoride-based polymer may be any resin including vinylidene fluoride units, and examples thereof include a homopolymer composed only of vinylidene fluoride units (polyvinylidene fluoride) and a copolymer including vinylidene fluoride units. The content of the vinylidene fluoride units in the vinylidene fluoride-based polymer is preferably 50% by mass or more, preferably 70% by mass or more, and more preferably 90% by mass or more.

Examples of other vinyl monomers copolymerizable with vinylidene fluoride include fluorinated vinyl monomers such as vinyl fluoride, tetrafluoroethylene, chlorotrifluoroethylene, and hexafluoropropylene; and vinyl monomers such as styrene, ethylene, butadiene, and propylene.

Among vinylidene fluoride-based polymers, polyvinylidene fluoride is preferable from the viewpoint of chemical resistance.

One of the vinylidene fluoride-based polymers may be used alone or two or more of thereof may be used in combination.

The mass-average molecular weight (Mw) of the fluorine-based resin (A) is preferably 100,000 or more from the viewpoint of chemical resistance, and 300,000 or less from the viewpoint of film producing properties.

Mw is a value obtained by measurement by gel permeation chromatography (GPC) under the following conditions.

<GPC Measurement Conditions>
Equipment used: HLC-8220GPC system manufactured by Tosoh Corp.
Column (guard): TSKgel Super Guad H-H (manufactured by Tosoh Corp.)
Column (main): 2 TSKgel Super HZM-H (manufactured by Tosoh Corp.)
Eluent: DMF including 0.01 mol/L LiCl
Column temperature: 40° C.
Detector: differential refractive index (RI)

It is preferable to use the fluorine-based resin (A1) and the fluorine-based resin (A2) in combination from the viewpoint of the matting stability at the time of film production.

[Fluorine-Based Resins (A1), (A2)]

The MFR as measured under the conditions of a temperature of 230° C. and a load of 49 N of the fluorine-based resin (A1) is preferably 15 to 30 g/10 min, more preferably 18 to 30 g/10 min, and even more preferably 20 to 30 g/10 min.

When the MFR of the fluorine-based resin (A1) is 15 g/10 min or more, the molding processability is excellent, and when the MFR thereof is 30 g/10 min or less, the process stability is excellent.

The MFR as measured under the conditions of a temperature of 230° C. and a load of 49 N of the fluorine-based resin (A2) is preferably 1.0 to 14 g/10 min, more preferably 1.0 to 10 g/10 min, and even more preferably 1.0 to 8.0 g/10 min.

When the MFR of the fluorine-based resin (A2) is 1.0 g/10 min or more, the molding processability is excellent, and when the MFR thereof is 14 g/10 min or less, the process stability is excellent.

Examples of commercially available products of the fluorine-based resin (A1) include KFT #850 (product name) (Mw 200,000 to 230,000) manufactured by Kureha Corporation.; and Kynar 720 (product name) and Kynar 710 (product name) manufactured by Arkema K. K.

Examples of commercially available products of the fluorine-based resin (A2) include KFT #1000 (product name) (Mw 250,000 to 270,000) manufactured by Kureha Corporation; Kynar 740 (product name) manufactured by Arkema K. K.; and Solef 6010 (product name) manufactured by Solvay Specialty Polymers, Inc.

The blending ratio of the fluorine-based resins (A1)/(A2) is preferably 95/5 to 50/50% by mass with respect to the total 100% by mass of (A1) and (A2), more preferably 90/10 to 50/50% by mass, and even more preferably 90/10 to 60/40% by mass.

When the fluorine-based resin (A1) is 95% by mass or less, the process stability is excellent, and when the content thereof is 50% by mass or more, a film in which generation of defects such as die lines and seedings is suppressed on the film surface can be provided.

[Matting Agent (B)]

Examples of the matting agent (B) in the present invention include various conventionally known matting agents regardless of organic-based and inorganic-based. One of the matting agents may be used alone or two or more of thereof may be used in combination.

In particular, an acrylic matting agent (D) described below is preferable from the viewpoint of compatibility with the fluorine-based resin (A).

[Acrylic Matting Agent (D)]

The acrylic matting agent (D) in the present invention is a polymer having an acrylic monomer unit as a main component.

The acrylic monomer unit is preferably an alkyl methacrylate unit, and the acrylic matting agent (D) preferably includes 50% by mass or more of an alkyl methacrylate unit. From the viewpoint of compatibility between the resin (A) and the acrylic matting agent (D), the total content of alkyl methacrylate units and alkyl acrylate units in the acrylic matting agent (D) is more preferably 70% by mass or more.

The acrylic matting agent (D) may be a polymer obtained from alkyl methacrylates or may be a copolymer obtained from an alkyl methacrylate and another monomer such as (meth)acrylic acid or styrene.

The acrylic matting agent (D) is preferably a hydroxyl group-containing polymer, in particular, from the viewpoint of developing favorable matte appearance of the film. Examples of the hydroxyl group-containing polymer include a hydroxyl group-containing polymer (1) shown below.

The hydroxyl group-containing polymer (1) is a polymer obtained by copolymerizing monomer components containing 5 to 50% by mass of a hydroxyalkyl (meth)acrylate having a hydroxyl group-containing alkyl group having 1 to 8 carbon atoms, 30 to 90% by mass of an alkyl methacrylate having an alkyl group having 1 to 13 carbon atoms, and 0.5 to 40% by mass of an alkyl acrylate having an alkyl group having 1 to 8 carbon atoms.

Examples of the hydroxyalkyl (meth)acrylates having a hydroxyl group-containing alkyl group having 1 to 8 carbon atoms include 2-hydroxyethyl methacrylate, 2-hydroxypropyl methacrylate, 2,3-dihydroxypropyl methacrylate, 2-hydroxyethyl acrylate, and 4-hydroxybutyl acrylate.

One of these may be used alone or two or more thereof may be used in combination.

Among them, 2-hydroxyethyl methacrylate is preferable from the viewpoint of matteness developability.

The content of hydroxyalkyl (meth)acrylate having a hydroxyl group-containing alkyl group having 1 to 8 carbon atoms in 100% by mass of the monomer components is preferably 5% by mass or more, more preferably 10% by mass or more, and even more preferably 20% by mass or more from the viewpoint that the matting properties of the film thus obtained becomes favorable.

Further, the content is preferably 50% by mass or less, and more preferably 40% by mass or less from the viewpoint that the dispersibility of the hydroxyl group-containing polymer (1) in the resin composition becomes favorable such that the film producing properties becomes favorable.

Examples of the alkyl methacrylates having an alkyl group having 1 to 13 carbon atoms include methyl methacrylate, ethyl methacrylate, n-propyl methacrylate, i-propyl methacrylate, n-butyl methacrylate, i-butyl methacrylate, and t-butyl methacrylate.

One of these may be used alone or two or more thereof may be used in combination.

Among them, methyl methacrylate is preferable from the viewpoint of weather resistance.

The content of the alkyl methacrylate having an alkyl group having 1 to 13 carbon atoms in 100% by mass of the monomer components is preferably 30% by mass or more, and more preferably 50% by mass or more from the viewpoint of weather resistance.

Further, the content is preferably 90% by mass or less, and more preferably 80% by mass or less, from the viewpoint of matteness developability.

Examples of the alkyl acrylates having an alkyl group having 1 to 8 carbon atoms include methyl acrylate, ethyl acrylate, n-propyl acrylate, i-propyl acrylate, n-butyl acrylate, i-butyl acrylate, t-butyl acrylate, and 2-ethyl hexyl acrylate.

One of these may be used alone or two or more thereof may be used in combination.

The content of the alkyl methacrylate having an alkyl group having 1 to 8 carbon atoms in 100% by mass of the monomer components is preferably 0.5% by mass or more, and more preferably 5% by mass or more from the viewpoint of dispersibility of the hydroxyl group-containing polymer (1) in the resin composition.

Further, the content is preferably 40% by mass or less, and more preferably 25% by mass or less, from the viewpoint of weather resistance and heat resistance.

The glass transition temperature (Tg) of the acrylic matting agent (D) is preferably 90° C. or less, and more preferably 80° C. or less from the viewpoint of dispersibility in the resin composition.

The Tg of the acrylic matting agent (D) is calculated from the FOX equation using the values of Tg of the homopolymer of each monomer component (as described in Polymer Handbook, J. Brandrup, Interscience, 1989).

The intrinsic viscosity of the acrylic matting agent (D) is preferably 0.3 L/g or less, and more preferably 0.12 L/g or less from the viewpoint that the dispersibility of the acrylic matting agent (D) in the resin composition becomes favorable such that the appearance of the film thus obtained becomes favorable.

The intrinsic viscosity is preferably 0.01 L/g or more from the viewpoint that the matting properties of the film thus obtained becomes favorable.

Further, the intrinsic viscosity of the acrylic matting agent (D) is a value measured at 25° C. using chloroform as a solvent using an AVL-2C automatic viscometer manufactured by SUN Electronic Industries Corporation.

The ratio Mw/Mn of the mass-average molecular weight (Mw) to the number-average molecular weight (Mn) of the acrylic matting agent (D) is preferably 2.2 or less.

As the Mw/Mn decreases, the molecular weight distribution of the acrylic matting agent (D) approaches closer to monodispersion, so the amount of high molecular weight components decreases and the generation of unmelted material causing the poor appearance of the film is suppressed.

Mw/Mn is a value obtained by measurement by gel permeation chromatography (GPC) under the following conditions.

<GPC Measurement Conditions>

Equipment used: HLC-8320GPC system manufactured by Tosoh Corp.

Column: 2 TGKgel SuperHZM-Hs (manufactured by Tosoh Corp., trade name)

Eluent: tetrahydrofuran

Column temperature: 40° C.

Detector: differential refractive index (RI)

The Mw of the acrylic matting agent (D) is preferably 30,000 to 200,000, and more preferably 50,000 to 200,000.

When the Mw of the acrylic matting agent (D) is 30,000 or more, the dispersibility in the resin composition becomes favorable, and when the Mw thereof is 200,000 or less, a fine-texture matte appearance can be developed.

[Method of Producing Acrylic Matting Agent (D)]

Examples of methods of producing the acrylic matting agent (D) include suspension polymerization and emulsion polymerization.

Examples of initiators used for suspension polymerization include known organic peroxides and azo compounds.

Examples of suspension stabilizers include known organic colloidal polymeric substances, inorganic colloidal polymeric substances, inorganic fine particles, and combinations of these with surfactants.

The acrylic matting agent (D) preferably contains no cullet having a particle diameter of 300 μm or more, and more preferably no cullet having a particle diameter of 100 μm or more. The cullet refers to a blocky substance produced by polymer adhering to a portion in contact with latex such as an inner wall surface of a polymerization tank during polymerization.

When an inorganic-based suspension stabilizer is used, it is preferable that bead-like substance of the obtained acrylic matting agent (D) be washed with water to reduce the content of inorganic substances in the acrylic matting agent (D), in order to suppress the generation of a fish eye in the film thus obtained so as to suppress the printing omission.

The average particle diameter of the matting agent (D) is preferably 300 μm or less, and more preferably 100 μm or less in order to efficiently remove the cullet by sieving and efficiently remove the inorganic substances by washing with water.

Further, the average particle diameter is preferably 10 μm or more from the viewpoint of polymer handling.

The average particle diameter of the matting agent (D) may be measured using a laser diffraction/scattering particle size distribution analyzer LA-910 manufactured by HORIBA Ltd.

[Acrylic Resin (C)]

The acrylic resin (C) of the present invention is a polymer having an acrylic monomer unit as a main component.

The acrylic monomer unit preferably has an alkyl methacrylate unit as a main component. The content of the alkyl methacrylate unit in this polymer is preferably 70% by mass or more.

Examples of alkyl methacrylates forming the alkyl methacrylate unit include methyl methacrylate, ethyl methacrylate, propyl methacrylate, n-butyl methacrylate, t-butyl methacrylate, t-butyl cyclohexyl methacrylate, and isobornyl methacrylate. One of these may be used alone or two or more thereof may be used in combination.

The acrylic resin (C) may include a unit of alkyl acrylates copolymerizable with alkyl methacrylate or/and a unit of other monomers copolymerizable with acrylic methacrylate. Examples of the alkyl acrylates copolymerizable with alkyl methacrylate include methyl acrylate, ethyl acrylate, propyl acrylate, n-butyl acrylate, 2-ethylhexyl acrylate, and n-octyl acrylate. Other monomers include acrylamide, styrene, acrylonitrile, and methacrylonitrile. One of these may be used alone or two or more thereof may be used in combination.

The Mw of the acrylic resin (C) is preferably 80,000 to 5,000,000, more preferably 500,000 to 5,000,000, even more preferably 1,000,000 to 4,000,000, and particularly preferably 1,000,000 to 3,500,000.

When the Mw of the acrylic resin (C) is 80,000 or more, the swell ratio of the resin composition increases, and die lines at the time of film production is improved and the appearance becomes favorable. When the Mw is 5,000,000 or less, the transparency of the film thus obtained becomes favorable. In addition, the Mw of the acrylic resin (C) is obtained by GPC measurement under the same conditions as the GPC measurement conditions for measuring the molecular weight of the acrylic matting agent (D).

The acrylic resin (C) is preferably a polymer not containing a hydroxyl group. The absence of a hydroxyl group in the acrylic resin (C) can suppress the gelation of the resin composition at the time of melt-kneading.

Examples of commercially available products of the acrylic resin (C) include METABLEN P (product name) manufactured by Mitsubishi Chemical Corporation; Kane Ace PA (product name) manufactured by Kaneka Corp.; and Acryloid (product name) manufactured by Rohm and Haas Company.

[Fluorine-Based Film]

The resin composition of the present invention is melted in an extruder and molded into a shape of film through a flat die (T-die) connected to the front end of the extruder. By molding the resin composition using the so-called "T-die extrusion method", it is allowed to be produced into the fluorine-based film.

In the performance evaluation of the matte film, 60-degree surface gloss is used as an index indicating the high-classness of the design. It is generally preferred that the 60-degree surface gloss be low.

The 60-degree surface gloss of the fluorine-based film is preferably 5 to 70%, more preferably 5 to 50%, and even more preferably 5 to 30%.

The surface gloss of the film is a value measured in accordance with JIS Z8741.

The total light beam transmittance measured in accordance with JIS K7361-1 as the light transmittance of the fluorine-based film is preferably 80% or more.

When the total light beam transmittance is 80% or more, the decorative layer printed on the film is beautiful when viewed from the side where the decorative layer is not printed.

The total light beam transmittance is more preferably 83% or more, and even more preferably 85% or more.

The haze of the fluorine-based film is not particularly limited as long as the total light beam transmittance is 80% or more.

The haze is preferably 90% or less, more preferably 80% or less, and even more preferably 70% or less from the viewpoint of the beauty of the appearance as a matte film.

Below, the fluorine-based film may be called "fluorine-based film (X)", and the layer of the fluorine-based film "(X) layer."

[Fluorine-Based Laminated Film]

A fluorine-based laminated film is a film in which the fluorine-based film (X) and an acrylic resin layer (Y) are laminated.

The thickness of the fluorine-based laminated film is preferably 10 to 500 µm, more preferably 15 to 200 µm, and even more preferably 40 to 200 µm.

When the thickness of the film is within these ranges, the laminated film has appropriate rigidity, and the laminate-ability and the secondary processability become favorable.

The thickness of the fluorine-based film (X) is preferably 1 to 50 µm, more preferably 2 to 40 µm, and even more preferably 3 to 30 µm from the viewpoint of solvent resistance, cost, surface hardness, transparency, matte appearance and printability of the fluorine-based laminated film.

The thickness of each layer is calculated by observing a sample obtained by cutting the fluorine-based laminated film in the cross-sectional direction to a thickness of 70 nm with a transmission electron microscope and measuring the respective thicknesses at five points and averaging the thicknesses.

As a commercially available product of the transmission electron microscope, for example, J100S (trade name) manufactured by JEOL Ltd. may be used.

The 60-degree surface gloss of the fluorine-based laminated film measured from the fluorine-based film side is preferably 5 to 70%, more preferably 5 to 50%, and even more preferably 5 to 30%.

The total light beam transmittance measured in accordance with JIS K7361-1 as the light transmittance of the fluorine-based laminated film is preferably 80% or more.

When the total light beam transmittance is 80% or more, the decorative layer printed on the film is beautiful when viewed from the side where the decorative layer is not printed.

The total light beam transmittance is more preferably 83% or more, and even more preferably 85% or more.

The haze of the fluorine-based laminated film is not particularly limited as long as the total light beam transmittance is 80% or more.

The haze is preferably 90% or less, more preferably 80% or less, and even more preferably 70% or less from the viewpoint of the beauty of the appearance as a matte film.

[Acrylic Resin Layer (Y)]

An acrylic resin layer (Y) is a layer including an acrylic resin composition (y). As the acrylic resin composition (y), an acrylic resin composition including a rubber-containing polymer (2) is preferable.

Examples of the rubber-containing polymer (2) include rubber-containing multistage polymers containing at least a known alkyl acrylate and/or an alkyl methacrylate and a graft crossing agent as constituent components of the polymer.

Specific examples of the rubber-containing multistage polymer include those formed by polymerizing an elastic polymer (S) including at least an alkyl acrylate having an alkyl group having 1 to 8 carbon atoms and/or an alkyl methacrylate having an alkyl group having 1 to 4 carbon atoms and a graft crossing agent as constituent components of the polymer and a hard polymer (H) including at least an alkyl methacrylate having an alkyl group having 1 to 4 carbon atoms as constituent components of the polymer in this order.

The elastic polymer (S) is, for example, a polymer made of an alkyl acrylate having an alkyl group having 1 to 8 carbon atoms and/or an alkyl methacrylate having an alkyl group having 1 to 4 carbon atoms (S1) (hereinafter referred to as "component (S1)"), another monomer (S2) (hereinafter referred to as "component (S2)") used as necessary, a polyfunctional monomer (S3) (hereinafter referred to as "component (S3)") used as necessary, and a graft crossing agent (S4) (hereinafter referred to as "component (S4)") as constituent components, and is polymerized first when polymerizing a rubber-containing multistage polymer.

Among the components (S1), the alkyl acrylate having an alkyl group having 1 to 8 carbon atoms may be linear or branched.

Specific examples thereof include methyl acrylate, ethyl acrylate, propyl acrylate, butyl acrylate, 2-ethylhexyl acrylate, and n-octyl acrylate.

One of these may be used alone or two or more thereof may be used in combination.

Among these, those having a low Tg are preferable, and butyl acrylate is more preferable.

Among the components (S1), the alkyl methacrylate having an alkyl group having 1 to 4 carbon atoms may be linear or branched.

Specific examples thereof include methyl methacrylate, ethyl methacrylate, propyl methacrylate, and butyl methacrylate.

One of these may be used alone or two or more thereof may be used in combination.

The ratio of the component (S1) is preferably 60 to 100% by mass with respect to a total of 100% by mass of the components (S1) to (S4).

Examples of the component (S2) include alkyl acrylate monomers such as an alkyl acrylate having an alkyl group having 9 or more carbon atoms, an alkoxy acrylate having an alkoxy group having 4 or less carbon atoms, and cyanoethyl acrylate; acrylamide, (meth)acrylic acid, styrene, alkyl substituted styrene, and (meth)acrylonitrile.

The ratio of the component (S2) is preferably 0 to 40% by mass with respect to a total of 100% by mass of the components (S1) to (S4).

Examples of the component (S3) include alkylene glycol dimethacrylates such as ethylene glycol dimethacrylate, 1,3-butylene glycol dimethacrylate, 1,4-butylene glycol dimethacrylate, and propylene glycol dimethacrylate; polyvinylbenzenes such as divinyl benzene and trivinylbenzene.

The ratio of the component (S3) is preferably 0 to 10% by mass with respect to a total of 100% by mass of the components (S1) to (S4).

Examples of the component (S4) include allyl, methallyl or crotyl esters of copolymerizable α,β-unsaturated carboxylic acids or dicarboxylic acids; triallyl cyanurate, and triallyl isocyanurate.

Among these, allyl esters of acrylic acid, methacrylic acid, maleic acid, or fumaric acid are preferable, and allyl methacrylate is more preferable.

In the component (S4), mainly, the conjugated unsaturated bond in the ester reacts much faster than that in the allyl group, methallyl group or crotyl group, and forms chemical bonding.

The ratio of the component (S4) used is preferably 0.1 to 5% by mass with respect to a total of 100% by mass of the components (S1) to (S4), more preferably 0.5 to 3% by mass, and even more preferably 0.8 to 3% by mass.

The lower limit values of these ranges are meaningful from the viewpoint of the effective amount of grafting. Further, the upper limit values are meaningful from the viewpoint of appropriately suppressing the amount of reaction with the polymer to be polymerized next to prevent the decrease in the elasticity of the rubber elastic body.

The content of the elastic polymer (S) in the rubber-containing multistage polymer is preferably 5 to 70% by mass, and more preferably 10 to 70% by mass.

The elastic polymer (S) may be polymerized in two or more stages. When the polymerization is performed in two or more stages, the ratio of monomer components constituting each stage may be changed.

The hard polymer (H) is a component imparting molding properties and mechanical properties to the rubber-containing multistage polymer, is a polymer made of an alkyl methacrylate having an alkyl group having 1 to 4 carbon atoms (H1) (hereinafter referred to as "component (H1)") and another monomer (H2) (hereinafter referred to as "component (H2)") used as necessary as constituent components, and is polymerized last when polymerizing a rubber-containing multistage polymer.

Preferred specific examples of the component (H1) and the component (H2) are the same as those listed for the components (S1) and (S2) of the elastic polymer (S), respectively.

The ratio of the component (H1) used is preferably 51 to 100% by mass with respect to a total of 100% by mass of the components (H1) and (H2).

The Tg of the hard polymer (H) alone is preferably 60° C. or more, and more preferably 80° C. or more.

The content of the hard polymer (H) in the rubber-containing multistage polymer is preferably 30 to 95% by mass, and more preferably 30 to 90% by mass.

The rubber-containing multistage polymer has an elastic polymer (S) and a hard polymer (H) as basic structures. Further, after polymerizing the elastic polymer (S), before polymerizing the hard polymer (H), one or more layers of an intermediate polymer (M) may be polymerized. The intermediate polymer (M) has a single point composition intermediate between the composition of the elastic polymer (S) and the composition of the hard polymer (H). By providing the intermediate polymer (M), it is possible to improve the transparency of the film thus obtained favorably.

The content of the intermediate polymer (M) in the rubber-containing multistage polymer is preferably 0 to 35% by mass, and more preferably 0 to 25% by mass with respect to a total of 100 parts by mass of the elastic polymer (S) and the hard polymer (H).

The average particle diameter of the rubber-containing polymer (2) is preferably 0.08 to 0.3 μm from the viewpoint of mechanical properties and transparency of the fluorine-based laminated film including the acrylic resin layer (Y) that includes the rubber-containing polymer (2) as a main component.

The acetone soluble fraction Mw of the rubber-containing polymer (2) is preferably 25,000 to 70,000, and more preferably 30,000 to 65,000. When this Mw is 25,000 or more, the mechanical strength of the laminated film thus obtained can be enhanced, and the crack at the time of molding process can be suppressed. Further, the laminated film thus obtained develops stress whitening resistance. When this Mw is 70,000 or less, the flexibility of the laminated film thus obtained is high, and the processability is excellent. After laminating the laminated film on a substrate such as a steel plate, whitening does not occur in the bent portion when bending is performed, and the appearance of various members thus obtained becomes favorable.

The gel content of the rubber-containing polymer (2) is preferably 50 to 70% by mass, and more preferably 55 to 70% by mass. When the gel content is 50% by mass or more, the mechanical strength of the laminated film thus obtained is high, and handling is easy. When the gel content is 70% by mass or less, the flowability at the time of molding is high, and continuous molding is possible.

The acrylic resin layer (Y) may contain a compounding agent as necessary.

Examples of the compounding agent include a stabilizer, a lubricant, a plasticizer, an impact resistance aid, a filler, an antibacterial agent, an antifungal agent, a foaming agent, a mold release agent, an antistatic agent, a colorant, a matting agent, an ultraviolet light absorber, and a thermoplastic resin.

When the laminated film is laminated on a substrate for the purpose of protecting the substrate, it is preferable to add the ultraviolet light absorber to the acrylic resin layer (Y) for imparting weather resistance. The molecular weight of the ultraviolet light absorber is preferably 300 or more, and more preferably 400 or more. When an ultraviolet light absorber having a molecular weight of 300 or more is used, for example, it is possible to suppress the disadvantageous phenomenon that the resin adheres to the roll when the film is produced and roll contamination occurs.

Further, it is preferable to add a light stabilizer to the acrylic resin layer (Y). As the light stabilizer, a radical scavenger such as a hindered amine-based light stabilizer is preferred.

Below, the acrylic resin layer (Y) may be called "(Y) layer."

[Method of Producing Fluorine-Based Laminated Film]

The fluorine-based laminated film can be provided by laminating the fluorine-based film (X) and the acrylic resin layer (Y).

As a method of producing the fluorine-based laminated film, a co-extrusion method in which the fluorine-based film (X) and the acrylic resin layer (Y) are simultaneously melt-extruded and laminated is preferable from the viewpoint of reducing the number of production steps.

Examples of methods of laminating a plurality of molten resin layers include, (1) a method of laminating a molten resin layer before passing through a die such as feed block method, (2) a method of laminating a molten resin layer in a die such as multi-manifold method, and (3) a method of laminating a molten resin layer after passing through a die such as a multi-slot method.

When lamination is performed while simultaneously melt-extruding the fluorine-based film (X) and the acrylic resin layer (Y), the melt-extrusion is preferably performed such that the acrylic resin layer (Y) is in contact with the cooling roll from the viewpoint of the matting properties of the surface of the fluorine-based film.

Specifically, the laminated film of the present invention may be produced by a producing method including the following steps.

Two melt extruders are prepared and their cylinder temperature and die temperature are set to 200 to 250° C. The resin composition of the fluorine-based film (X) is melt-plasticized in one of the extruders. At the same time, the acrylic resin composition (y) is melt-plasticized in the other extruder. The molten resins extruded from the dies in the front ends of both extruders are co-extruded on a cooling roll set to 50 to 100° C.

The fluorine-based laminated film may have a pattern layer on at least one surface. From the viewpoint of printability, it is preferable to have a pattern layer on the acrylic resin layer (Y) side.

The pattern layer constituting a decorative film may be formed by a known method. Examples of patterns to be printed include patterns including wood grain, stone grain, cloth grain, sand grain, geometric pattern, letters, all-solid texture, metallic texture, or the like.

Examples of methods of forming the print layer include known printing methods such as offset printing, gravure rotary printing, screen printing, and flexographic printing, and known coating methods such as roll coating and spray coating. The thickness of the print layer may be appropriately determined as necessary and is usually about 0.5 to 30 µm.

[Stretch Whitening Resistance of Laminated Film]

In the present invention, "stress whitening" refers to a phenomenon in which the fulcrum portion changes white when a decorative sheet or the like is bonded on a substrate, and this substrate is subjected to bending to form various members such as window frames.

It is preferable for the laminated film of the present invention that when an initial distance between chucks is set to 25 mm and a test piece is stretched by 10 mm to a distance between chucks of 35 mm under the conditions at a tensile speed of 500 mm/min and a temperature of 0° C. in accordance with ISO 527-3 using a laminated film obtained by molding in a thickness of 0.05 to 0.1 mm and a width of 15 mm as the test piece, a difference ($\Delta W$) in whiteness (W value) of the test piece between before and after stretching be 10 or less. From the viewpoint of stress whitening resistance, $\Delta W$ is preferably 5 or less, and more preferably 4 or less.

Here, the W value is a value measured using a C/2° light source in accordance with the geometric condition a of JIS Z8722.

When $\Delta W$ between before and after stretching is 10 or less, when the film is bent, the bent portions do not whiten or the whitening is not noticeable, so that the appearance of the laminated film thus obtained becomes favorable.

[Fluorine-Based Laminated Molded Body]

By further laminating the fluorine-based laminated film on a substrate, a fluorine-based laminated molded body having the fluorine-based film (X) on a surface can be produced. Here, lamination is performed such that a surface on the acrylic resin layer (Y) side is in contact with the substrate.

The substrate can be appropriately selected according to the desired laminated molded body, and examples of the material of substrate include resin, wood veneer, wood plywood, particle board, wood board such as medium density fiber board (MDF), wooden board such as wooden fiber board, and metal such as iron and aluminum.

In the case of the resin molded product, thermoplastic resins, such as polyvinyl chloride resin, an olefin resin, an ABS resin, and polycarbonate resin may be mentioned.

When the substrate has a two-dimensional shape and is formed of a heat-fusible material, the substrate and the laminated film may be laminated by a method such as heat-lamination.

For a metallic member or the like which is difficult to be heat-fused, an adhesive may be used, or one side of the laminated film may be subjected to a tackiness imparting process to perform lamination.

EXAMPLES

Hereinafter, the present invention will be specifically described by way of Examples, but the present invention is not limited thereto. In the following description, "parts"

indicates "parts by mass" and "%" indicates "% by mass". The abbreviations indicate the followings.

MMA: methyl methacrylate
BA: n-butyl acrylate
BDMA: 1,3-butylene glycol dimethacrylate
AMA: allyl methacrylate
MA: methyl acrylate
HEMA: 2-hydroxyethyl methacrylate
St: styrene
LPO: lauryl peroxide
CHP: cumene hydroperoxide
tBH: t-butyl hydroperoxide
RS610: mono-n-dodecyloxytetraoxyethylene sodium phosphate (Phosphanol RS-610NA (trade name), manufactured by Toho Chemical Co., Ltd.)
OTP: di-2-ethylhexyl sulfosuccinate sodium (Perex OT-P (product name), manufactured by Kao Corporation)
nOM: n-octyl mercaptan
EDTA: ethylenediaminetetraacetic acid disodium salt
SFS: sodium formaldehyde sulfoxylate
PVDF: polyvinylidene fluoride

[Evaluation Method]

(1) Average Particle Diameter of Matting Agent (B):

The mass-average particle diameter of the matting agent (B) was measured using a laser diffraction/scattering particle size distribution analyzer LA-910 (trade name) manufactured by HORIBA Ltd.

(2) Intrinsic Viscosity of Matting Agent (B):

The intrinsic viscosity of the matting agent (B) was measured in a chloroform solvent at 25° C. with an AVL-2C automatic viscometer manufactured by SUN Electronic Industries Corporation.

(3) Average Particle Diameter of Rubber-Containing Polymer (2):

Using a light scattering photometer DLS-700 (trade name) manufactured by Otsuka Electronics Co., Ltd., the mass-average particle diameter of the rubber-containing polymer (2) was measured by the dynamic light scattering method.

(4) Gel Content of Rubber-Containing Polymer (2):

A powder of the rubber-containing polymer (2) of a predetermined amount (mass before extraction) is subjected to extraction treatment under reflux in an acetone solvent, and the obtained treatment liquid was separated by centrifugation and dried, and then the mass of acetone insoluble fraction (mass after extraction) was measured. The gel content was calculated by the following equation.

Gel Content (%)=(Mass After Extraction (g)/Mass Before Extraction (g))×100

(5) Swell Ratio:

The obtained resin pellet was dried at 75° C. for 5 hours or more, and then the value of the swell ratio thereof at a measurement temperature of 230° C., an ambient temperature of 23° C., and a shear rate of 96 (1/sec) was measured using a capillary rheometer (manufactured by ROSAND Co., Ltd., model: RH-7, orifice diameter φ1 mm, L=10 mm).

The swell ratio was obtained by measuring the strand diameter at a position 4.0 cm away from the orifice and dividing the diameter by 1 mm of the orifice diameter.

For example, when the strand diameter at a position 4.0 cm away from the orifice is 1.20 mm, the swell ratio is 1.20.

(6) MFR:

The MFR values of the resin composition and the matting agent under the conditions of a temperature of 230° C. and a load of 5.0 kg (49 N) were measured using a melt indexer (manufactured by Techno Seven Co., Ltd.) in accordance with JIS K7210.

(7) 60-Degree Surface Gloss:

The 60-degree surface gloss on the fluorine-based film side of the laminated film was measured using a portable gloss meter (manufactured by Konica Minolta Sensing, Inc., trade name: GM-268) in accordance with JIS Z8741.

(8) Total Light Beam Transmittance, Haze:

With respect to the total light beam transmittance in accordance with JIS K7361-1 and the haze in accordance with JIS K7136, the total light beam transmittance and haze of the laminated film under the conditions of a light source D65 and a temperature of 25° C. were measured using a haze meter (manufactured by Nippon Denshoku Industries Co., Ltd., trade name: NDH4000).

(9) Evaluation of Die Build-Up at the Time of Film Production:

One hour after introduction of the resin composition of the fluorine-based film (X) as the film raw material into a film producing machine, the presence or absence of the die build-up near the discharge opening of the T-die was evaluated visually.

○: no die build-up near the discharge opening of T-die

Δ: less than 5 minute die build-ups near the discharge opening of T-die x: 5 or more die build-ups near the discharge opening of T-die

(10) Chemical Resistance:

After absorbent cotton is impregnated with methyl ethyl ketone and the absorbent cotton was reciprocated 20 times on the fluorine-based resin layer (X) of the laminated film, changes in the appearance of the laminated film were visually evaluated according to the following criteria.

One drop of 10% by mass of lactic acid aqueous solution was dropped onto the fluorine-based resin layer (X) of the laminated film and the laminated film was heated at 80° C. for 24 hours, then changes in the appearance of the laminated film were visually evaluated according to the following criteria.

○: no change in appearance

Δ: slight change in appearance (swelling or cloudiness)

x: significant change in appearance (swelling or cloudiness)

(11) ΔW between Before and After Stretching:

In accordance with ISO 527-3, using a Strograph T (trade name) (manufactured by Toyo Seiki Seisaku-sho Ltd.), the laminated film was stretched by 10 mm from an initial distance between chucks 25 mm to 35 mm under the conditions of a temperature of 0° C. and a tensile speed of 500 mm/min. At that time, the whiteness (W value) of the test piece was measured using a spectrocolorimeter (manufactured by Nippon Denshoku Industries Co., Ltd., trade name: SE2000) in accordance with the geometric condition a of JIS Z8722 using a C/2° light source before and after stretching to obtain the difference ΔW.

Production Example 1

Production of Hydroxyl Group-Containing Polymer (1-1)

The following monomer mixture (1) was charged in a reaction vessel equipped with a stirrer, a reflux condenser, a nitrogen gas inlet and the like. Next, after the inside of the vessel was sufficiently replaced with nitrogen gas, the monomer mixture (1) in the reaction vessel was heated to 75° C.

with stirring, and reacted for 3 hours in a nitrogen gas flow. Thereafter, the temperature in the reaction vessel was raised to 90° C. and held for another 45 minutes to complete the polymerization, followed by sieving with an aperture of 100 μm, and the beads having passed through were dehydrated and dried to obtain a hydroxyl group-containing polymer (1-1).

The obtained hydroxyl group-containing polymer (1-1) had a Tg of 77° C., an intrinsic viscosity of 0.06 L/g, an Mw/Mn of 2.1, and an average particle diameter of 70 μm.

<Monomer Mixture (1)>
MA: 10 parts
MMA: 60 parts
HEMA: 30 parts
nOM: 0.18 parts
LPO: 1 part
Tricalcium phosphate: 1.8 parts
Deionized water: 250 parts Production Example 2

Production of Hydroxyl Group-Containing Polymer (1-2)

A hydroxyl group-containing polymer (1-2) was obtained in the same manner as in Production Example 1 except that the monomer mixture (1) was changed to the following monomer mixture (2). The obtained hydroxyl group-containing polymer (1-2) had a Tg of 93° C., an intrinsic viscosity of 0.079 L/g, an Mw/Mn of 2.1, and an average particle diameter of 75 μm.

<Monomer Mixture (2)>
MA: 1 part
MMA: 79 parts
HEMA: 20 parts
nOM: 0.18 parts
LPO: 1 part
Tricalcium phosphate: 1.8 parts
Deionized water: 250 parts Production Example 3

Production of Rubber-Containing Polymer (2-1)

After placing 195 parts of deionized water in a polymerization vessel equipped with a stirrer, a cooling pipe, a thermocouple, and a nitrogen introducing pipe, a mixture in which 0.3 parts of MMA, 4.5 parts of BA, 0.05 parts of AMA, 0.2 parts of BDMA, 0.025 parts of CHP, and 1.1 parts of RS610 were preliminarily mixed was introduced, and the mixture was heated to 75° C. After the heating, a mixture including 5 parts of deionized water, 0.20 parts of SFS, 0.0001 parts of ferrous sulfate, and 0.0003 parts of EDTA was introduced at once into the polymerization vessel to initiate polymerization. After confirming that the temperature had reached its peak, the mixture was held for 15 minutes to complete the polymerization to obtain a first elastic polymer (S-1-1).

Subsequently, 1.5 parts of MMA, 22.5 parts of BA, 0.25 parts of AMA, 1.0 part of BDMA, and 0.016 parts of CHP were dropped into the polymerization vessel over 90 minutes. Thereafter, the mixture was held for 60 minutes to complete the polymerization to obtain a second elastic polymer (S-2-1).

The Tg of each of the first elastic polymer (S-1-1) and the second elastic polymer (S-2-1) was −50.2° C.

Subsequently, 6.0 parts of MMA, 4.0 parts of BA, 0.075 parts of AMA, and 0.0125 parts of CHP were dropped into the polymerization vessel over 45 minutes. Thereafter, the mixture was held for 60 minutes to complete the polymerization to obtain an intermediate polymer (M-1). The Tg of the intermediate polymer (M-1) alone was 19.8° C.

Finally, 55.2 parts of MMA, 4.8 parts of BA, 0.075 parts of tBH, and 0.23 parts of nOM were dropped into the polymerization vessel over 140 minutes. Thereafter, the mixture was held for 60 minutes to complete the polymerization to obtain a hard polymer (H-1). The Tg of the hard polymer (H-1) alone was 79.3° C.

The solid content of the obtained rubber-containing polymer (2-1) in the form of latex was 33%, and the average particle diameter was 0.12 μm.

By a vibrating filter equipped with a mesh made of SUS with an aperture of 62 μm, 100 parts of the rubber-containing polymer (2-1) in the form of latex was filtered. Next, the filtered latex was dropped into 100 parts of hot water at 80° C. including 2.5 parts of calcium acetate to cause the latex to be coagulated. The coagulated latex was further heated to 95° C., held for 5 minutes, and solidified. The obtained coagulated material was separated and washed and dried at 75° C. for 24 hours to obtain a powdery rubber-containing polymer (2-1). The gel content of the rubber-containing polymer (2-1) was 60%, and the Mw was 58,000.

The composition of the monomer mixture used to form each polymer is shown in Table 1.

TABLE 1

| | | Rubber-containing polymer (2) | | | | |
|---|---|---|---|---|---|---|
| | | (2-1) | (2-2) | (2-3) | (2-4) | (2-5) |
| First elastic polymer (S-1) [parts] | MMA | 0.3 | 0.3 | 11.25 | 0.3 | 0.2 |
| | BA | 4.5 | 4.5 | 12.5 | 0.7 | 4.5 |
| | St | — | — | 1.25 | — | — |
| | BDMA | 0.2 | 0.2 | 0.75 | — | 0.3 |
| | AMA | 0.05 | 0.05 | 0.0938 | 0.08 | 0.15 |
| | RS610 | 1.1 | 1.3 | 0.75 | — | 1.1 |
| | OTP | — | — | — | 1 | — |
| | CHP | 0.025 | 0 | — | 0.025 | 0.025 |
| | tBH | — | — | 0.0438 | — | — |
| Second elastic polymer (S-2) [parts] | MMA | 1.5 | 9.6 | — | 3 | 1 |
| | BA | 22.5 | 14.4 | 30.94 | 47.0 | 22.5 |
| | St | — | — | 6.56 | — | — |
| | BDMA | 1 | 1 | 0.094 | — | 1.5 |
| | AMA | 0.25 | 0.25 | 0.656 | 0.80 | 0.75 |
| | CHP | 0.016 | 0.016 | 0.106 | 0.10 | 0.016 |
| | RS610 | — | — | 0.75 | — | — |
| Intermediate polymer (M) [parts] | MMA | 6 | 6 | — | — | 6 |
| | BDMA | 4 | 4 | — | — | 4 |
| | AMA | 0.075 | 0.075 | — | — | 0.075 |
| | CHP | 0.013 | 0.013 | — | — | 0.013 |
| Hard polymer (H) [parts] | MMA | 55.2 | 57 | 35.6 | 40.5 | 55.2 |
| | BA | 4.8 | 3 | — | 4.5 | 4.8 |
| | MA | — | — | 1.9 | — | — |
| | tBH | 0.075 | 0.075 | 0.064 | 0.14 | 0.075 |
| | nOM | 0.23 | 0.264 | 0.113 | 0.30 | 0.26 |

Production Example 4

Production of Rubber-Containing Polymer (2-2)

A rubber-containing polymer (2-2) was obtained in the same manner as in Production Example 3 except that the amount of (2-2) added was set as listed in Table 1.

The obtained rubber-containing polymer (2-2) had an average particle diameter of 0.11 μm. The gel content of this rubber-containing polymer (2-2) was 70%, and the Mw was 58,000.

Production Example 5

Production of Rubber-Containing Polymer (2-3)

A rubber-containing polymer (2-3) was obtained at the amount of (2-3) added listed in Table 1.

Into a polymerization vessel equipped with a reflux condenser, 244 parts of deionized water was placed, and the temperature was raised to 80° C. Next, a mixed aqueous solution of 0.6 parts of SFS, 0.00012 parts of ferrous sulfate, and 0.0003 parts of EDTA was added to the polymerization vessel and 1/15 of a monomer mixture of a first stage (first elastic polymer S-1) was charged while stirring under nitrogen atmosphere, and held for 15 minutes.

Next, the remaining monomer mixture of the first stage was dropped into the polymerization vessel such that the rate of increase with respect to water was 8%/hour, and then the mixture was held for 60 minutes to obtain a latex of a polymer. The Tg of the polymer thus obtained from the monomer mixture of the first stage was 4° C.

Into the latex of this polymer, 0.6 parts of SFS was added and the mixture was held for 15 minutes. Next, while stirring at 80° C. under nitrogen atmosphere, a monomer mixture of a second stage (second elastic polymer S-2) was dropped into the polymerization vessel such that the rate of increase with respect to water was 4%/hour, and then the mixture was held for 120 minutes to obtain a latex of a polymer. The Tg of the polymer thus obtained from the monomer mixture of the second stage was −37° C.

Into the latex of this polymer, 0.4 parts of SFS was added and the mixture was held for 15 minutes. Next, while stirring at 80° C. under nitrogen atmosphere, the monomer mixture for forming hard polymer was dropped into the polymerization vessel such that the rate of increase with respect to water was 10%/hour, and then the mixture was held for 60 minutes to obtain a latex of the rubber-containing polymer (2-3). The Tg of the hard polymer was 99° C.

The obtained rubber-containing polymer (2-3) had an average particle diameter of 0.28 μm.

The rubber-containing polymer (2-3) in the form of latex was salted out in an aqueous solution including 3.5 parts of calcium acetate, washed with water to recover the solid content, and then dried to obtain a powdery rubber-containing polymer (2-3). The gel content of the rubber-containing polymer (2-3) was 90%, and the Mw was 45,000.

Production Example 6

Production of Rubber-Containing Polymer (2-4)

A rubber-containing polymer (2-4) was obtained in the same manner as in Production Example 3 except that the amount of (2-4) added was set as listed in Table 1, and the intermediate polymer (M) had not been formed. The gel content of the rubber-containing polymer (2-4) was 66%, and the Mw was 37,000.

Production Example 7

Production of Rubber-Containing Polymer (2-5)

A rubber-containing polymer (2-5) was obtained in the same manner as in Production Example 3 except that the amount of (2-5) added was set as listed in Table 1. The gel content of the rubber-containing polymer (2-5) was 64%, and the Mw was 46,000.

Production Example 8

Production of Acrylic Resin Composition (y-1)

One hundred parts of the rubber-containing polymer (2-1), 2.0 parts of processing aid (manufactured by Mitsubishi Chemical Corporation, trade name: METABLEN P551A), 2.1 parts of ultraviolet light absorber (manufactured by ADEKA Corporation, trade name: ADK STAB LA-31), 0.3 parts of light stabilizer (manufacture by ADEKA Corporation, trade name: LA-57), and 0.1 parts of phenolic antioxidant (BASF Japan Ltd., trade name: Irganox 1076) were mixed using a HENSCHEL mixer.

This mixture was melt-kneaded at a cylinder temperature of 100 to 240° C. and a die temperature of 240° C. using a degassing extruder (manufactured by Toshiba Machine Co., Ltd., trade name: TEM-35B, hereinafter the same model) to obtain a pellet of an acrylic resin composition (y-1). Table 2 shows the blend composition of the acrylic resin composition (y-1) and those of (y-2) to (y-5) described below.

TABLE 2

|  | Acrylic resin composition (y) [parts] | | | | |
|---|---|---|---|---|---|
|  | (y-1) | (y-2) | (y-3) | (y-4) | (y-5) |
| Rubber-containing polymer (2-1) | 100 | — | — | — | — |
| Rubber-containing polymer (2-2) | — | 80 | — | — | — |
| Rubber-containing polymer (2-3) | — | 10 | — | — | — |
| Acrypet MD001 | — | 10 | — | — | — |
| Acrypet IR377 | — | — | 70 | — | — |
| Acrypet MF001 | — | — | 30 | — | — |
| Rubber-containing polymer (2-4) | — | — | — | 100 | — |
| Rubber-containing polymer (2-5) | — | — | — | — | 100 |

Acrypet MD 001 (trade name): acrylic resin (Mw 100,000) (manufactured by Mitsubishi Chemical Corporation)
Acrypet IR 377 (trade name): acrylate rubber-containing polymer (manufactured by Mitsubishi Chemical Corporation)
Acrypet MF 001 (trade name): acrylic resin (Mw 100,000) (manufactured by Mitsubishi Chemical Corporation)

Production Examples 9 to 12

Production of Acrylic Resin Compositions (y-2) to (y-5)

Pellets of acrylic resin compositions (y-2) to (y-5) were obtained in the same manner as in Production Example 8 (using the same for other additives) except that the compositions were as shown in Table 2.

Example 1

A multi-manifold die was installed in the front end portions of a 40 mm φ single-screw extruder 1 and a 30 mm φ single-screw extruder 2.

The pellet of the acrylic resin composition (y-1) obtained in Production Example 8 was supplied to the single-screw extruder 1 at a cylinder temperature of 230 to 240° C. and melt-plasticized.

Apart from this, 71 parts of KFT #850 as the fluorine-based resin (A1), 20 parts of KFT #1000 as the fluorine-based resin (A2), and 9 parts of a hydroxyl group-containing polymer (1-1) as the matting agent (B), 2 parts of METABLEN P551A as the acrylic resin (C), and 0.1 parts of antioxidant (manufactured by ADEKA Corporation, trade name: ADK STAB AO-60) were blended, and mixed using a HENSCHEL mixer.

This mixture was pelletized by melt-kneading using a degassing extruder at a cylinder temperature of 100 to 240° C. and a die temperature of 240° C. This pellet was supplied to the single-screw extruder 2 at a cylinder temperature of 200 to 230° C. and melt-plasticized.

These melt-plasticized products were supplied to a multi-manifold die heated to 250° C. to obtain a laminated film having a thickness of 5.0 μm for the (X) layer and a thickness of 45.0 μm for the (Y) layer.

At this time, the temperature of the cooling roll was set to 90° C., and the (Y) layer was arranged to be in contact with the cooling roll to obtain a laminated film. The evaluation results of the obtained laminated film are shown in Table 3.

TABLE 3

| | | | Examples | | | | | | |
|---|---|---|---|---|---|---|---|---|---|
| | | | 1 | 2 | 3 | 4 | 5 | 6 | 7 |
| Fluorine-based film (X) [parts] | Fluorine-based resin (A) | KFT #850 | 71 | 71 | 76 | 69 | 71 | 71 | 74 |
| | | KFT #1000 | 20 | 20 | 21 | 19 | 20 | 20 | 21 |
| | | Kynar 740 | — | — | — | — | — | — | — |
| | Matting agent (B) | Hydroxyl group-containing polymer (1-1) | 9 | 9 | 3 | 12 | 9 | 9 | — |
| | | Hydroxyl group-containing polymer (1-2) | — | — | — | — | — | — | 5 |
| | | Epostar MA1004 | — | — | — | — | — | — | — |
| | Acrylic resin (C) | Acrypet VH001 | — | — | — | — | — | — | — |
| | | METABLEN P551A | 2 | 5 | 2 | 2 | — | — | 2 |
| | | METABLEN P530A | — | — | — | — | — | 2 | — |
| Acrylic resin layer (Y) [parts] | | Acrylic resin composition (y-1) | 100 | 100 | 100 | 100 | 100 | 100 | 100 |
| | | Acrylic resin composition (y-2) | — | — | — | — | — | — | — |
| | | Acrylic resin composition (y-3) | — | — | — | — | — | — | — |
| Thickness of fluorine-based resin layer (X) [μm] | | | 5 | 5 | 5 | 5 | 5 | 5 | 5 |
| Thickness of f acrylic resin layer (Y) [μm] | | | 45 | 45 | 45 | 45 | 45 | 45 | 45 |
| Resin characteristics | | Swell ratio | 1.61 | 1.59 | 1.30 | 1.48 | 1.07 | 1.28 | 1.59 |
| | | $MFR_{A+C}$ [g/10 min] | 14.86 | 11.58 | 14.88 | 14.73 | 15.76 | 12.28 | 14.76 |
| | | $MFR_B$ [g/10 min] | 1.30 | 1.30 | 1.30 | 1.30 | 1.30 | 1.30 | 0.40 |
| | | $MFR_{A+C}$-$MFR_B$ [g/10 min] | 13.6 | 10.3 | 13.6 | 13.4 | 14.5 | 11.0 | 14.4 |
| Optical characteristics | | Total light beam transmittance [%] | 93.7 | 93.3 | 93.1 | 95.0 | 93.1 | 93.0 | 90.5 |
| | | Haze [%] | 55.2 | 46.2 | 12.4 | 77.7 | 56.0 | 62.5 | 38.1 |
| | | 60-degree surface gloss [%] | 14.9 | 19.5 | 71.0 | 10.5 | 15.6 | 12.0 | 17.4 |
| Die build-up adherence | | | ○ | ○ | ○ | ○ | Δ | ○ | ○ |
| Chemical resistance | | Methyl ethyl ketone | ○ | ○ | ○ | ○ | ○ | ○ | ○ |
| | | 10% Lactic acid | ○ | ○ | ○ | ○ | ○ | ○ | ○ |

| | | | Examples | | | | | | | Comparative Examples | |
|---|---|---|---|---|---|---|---|---|---|---|---|
| | | | 8 | 9 | 10 | 11 | 12 | 13 | 14 | 1 | 2 |
| Fluorine-based film (X) [parts] | Fluorine-based resin (A) | KFT #850 | 71 | 71 | 88 | 88 | 88 | 88 | 71 | 91 | 88 |
| | | KFT #1000 | 20 | — | — | — | — | — | 20 | — | — |
| | | Kynar 740 | — | 20 | — | — | — | — | — | — | — |
| | Matting agent (B) | Hydroxyl group-containing polymer (1-1) | — | 9 | 12 | 12 | 12 | 12 | 9 | 9 | 12 |
| | | Hydroxyl group-containing polymer (1-2) | — | — | — | — | — | — | — | — | — |
| | | Epostar MA1004 | 9 | — | — | — | — | — | — | — | — |
| | Acrylic resin (C) | Acrypet VH001 | — | — | 30 | 30 | 30 | 30 | — | — | 30 |
| | | METABLEN P551A | 2 | 5 | 4 | 6 | — | — | 2 | — | — |
| | | METABLEN P530A | — | — | — | — | 4 | 6 | — | — | — |
| Acrylic resin layer (Y) [parts] | | Acrylic resin composition (y-1) | 100 | 100 | — | — | — | — | — | 100 | — |
| | | Acrylic resin composition (y-2) | — | — | 100 | 100 | 100 | 100 | — | — | 100 |
| | | Acrylic resin composition (y-3) | — | — | — | — | — | — | 100 | — | — |
| Thickness of fluorine-based resin layer (X) [μm] | | | 5 | 5 | 12.5 | 12.5 | 12.5 | 12.5 | 5 | 5 | 12.5 |
| Thickness of f acrylic resin layer (Y) [μm] | | | 45 | 45 | 112.5 | 112.5 | 112.5 | 112.5 | 45 | 45 | 112.5 |
| Resin characteristics | | Swell ratio | 1.73 | 1.61 | 1.24 | 1.36 | 1.31 | 1.43 | 1.33 | 0.49 | 0.80 |
| | | $MFR_{A+C}$ [g/10 min] | 14.86 | 13.08 | 15.04 | 13.24 | 13.21 | 11.52 | 14.86 | 20.4 | 16.48 |
| | | $MFR_B$ [g/10 min] | 0.025 | 1.30 | 1.30 | 1.30 | 1.30 | 1.30 | 1.30 | 1.30 | 1.30 |
| | | $MFR_{A+C}$-$MFR_B$ [g/10 min] | 14.8 | 11.8 | 13.7 | 11.9 | 11.9 | 10.2 | 13.6 | 19.1 | 15.2 |

TABLE 3-continued

| | | | | | | | | | | |
|---|---|---|---|---|---|---|---|---|---|---|
| Optical characteristics | Total light beam transmittance [%] | 92.3 | 93.6 | 92.8 | 93.1 | 93.1 | 93.4 | 94.8 | 94.1 | 91.9 |
| | Haze [%] | 63.7 | 49.8 | 55.8 | 44.2 | 38.8 | 30.9 | 75.6 | 53.3 | 57.7 |
| | 60-degree surface gloss [%] | 13.0 | 16.1 | 16.0 | 23.7 | 28.6 | 42.2 | 10.1 | 14.4 | 13.3 |
| | Die build-up adherence | Δ | ○ | ○ | ○ | ○ | ○ | ○ | X | X |
| Chemical resistance | Methyl ethyl ketone | ○ | ○ | Δ | Δ | Δ | Δ | ○ | ○ | Δ |
| | 10% Lactic acid | ○ | ○ | ○ | ○ | ○ | ○ | ○ | ○ | ○ |

KFT #850 (trade name): PVDF (manufactured by Kureha Corporation)
KFT #1000 (trade name): PVDF (manufactured by Kureha Corporation)
Kynar 740 (trade name): PVDF (manufactured by Arkema K. K.)
Acrypet VH001 (trade name): acrylic resin (manufactured by Mitsubishi Chemical Corporation)
Epostar MA1004 (trade name): acrylate crosslinked fine particles (average particle diameter 4 μm) (manufactured by Nippon Shokubai Co., Ltd.)
METABLEN P551A (trade name): processing aid (Mw 1,500,000) (manufactured by Mitsubishi Chemical Corporation)
METABLEN P530A (trade name): processing aid (Mw 3,000,000) (manufactured by Mitsubishi Chemical Corporation)

Mw and Mn of the hydroxyl group-containing polymers (1-1) and (1-2) and Mw of the rubber-containing polymers (2-1) to (2-5) were obtained by GPC measurement under the following conditions.

<GPC Measurement Conditions>

Equipment used: HLC-8320 GPC system manufactured by Tosoh Corp.

Column: 2 TGKgel SuperHZM-Hs (manufactured by Tosoh Corp., trade name)

Eluent: tetrahydrofuran

Column temperature: 40° C.

Detector: differential refractive index (RI)

Examples 2 to 14

Laminated films were obtained in the same manner as in Example 1 (using the same for other additives) except that the compositions and the thicknesses of the resin layers (X) and (Y) were set to as shown in Table 3. Here, Examples 2 to 9 and 14 have a thickness of 50 μm, and Examples 10 to 13 have a thickness of 125 μm.

The evaluation results of the obtained laminated film are shown in Table 3.

Example 15

A silver metallic pattern was provided by gravure printing as a pattern layer on the acrylic resin layer side of the fluorine-based laminated film obtained in Example 1 to obtain a decorative film.

Furthermore, an ABS sheet having a thickness of 0.35 mm having an adhesive layer as the thermoplastic resin was laminated by thermal lamination such that the adhesive layer and the silver metallic pattern layer were in contact with each other to obtain a laminate sheet.

Molding was carried out using this laminate sheet. Specifically, this laminate sheet was placed in a mold having a vacuum drawing function such that the fluorine-based film side is on the cavity side, and after heating with a heater until the laminate sheet reaches 190° C., vacuum forming was carried out.

Unnecessary portions of the vacuum formed laminated sheet (portions not adhered to the substrate in the final laminated body) were trimmed from the fluorine-based film side using a Thomson punching die. On the bottom of the mold on the cavity side, the bottom having a 1 cm² and 1 mm-deep recess, at a position spaced away by 3 cm in a lateral direction from the central gate, the trimmed laminated sheet was arranged such that the fluorine-based film side is on the cavity side.

Next, an ABS resin (manufactured by UMG ABS Co., Ltd., trade name: Diapet ABS "BULKSAM TM 25B") as a substrate was injected and molded on the thermoplastic resin side of the laminated sheet to obtain a laminated molded body by insert molding.

The obtained laminated molded body was a silver metallic molded product with favorable matteness.

Comparative Example 1

A laminated film having a thickness of 50 μm was obtained in the same manner as in Example 1 except that the composition was as shown in Table 3. The evaluation results of the obtained laminated film are shown in Table 3.

Although the 60-degree gloss was as low as 14.4 and the designability was favorable, the swell ratio was as low as 0.49, and the die build-up was generated during film production.

Comparative Example 2

A laminated film including the (X) layer having a thickness of 12.5 μm and the (Y) layer having a thickness of 112.5 μm was obtained in the same manner as in Example 1 except that the compositions and the thicknesses of the resin layers (X) and (Y) were set as shown in Table 3. The evaluation results of the obtained laminated film are shown in Table 3.

Similar to Comparative Example 1, although the gloss was low and the designability was favorable, the swell ratio was low and die build-up was generated at the time of film production.

Example 16

A laminated film having a thickness of 50 μm was obtained in the same manner as in Example 1 except that the acrylic resin composition was changed to (y-4). The evaluation results of the obtained laminated film are shown in Table 4. Table 4 shows ΔW between before and after stretching.

Examples 17 to 19

Laminated films having a thickness of 50 μm were obtained in the same manner as in Example 1 except that the compositions were as shown in Table 4. The evaluation results of the obtained laminated film are shown in Table 4.

TABLE 4

| | | | Examples | | | | | |
|---|---|---|---|---|---|---|---|---|
| | | | 1 | 2 | 16 | 17 | 18 | 19 |
| Fluorine-based film (X) [parts] | Fluorine-based resin (A) | KFT #850 | 71 | 71 | 71 | 71 | 71 | 71 |
| | | KFT #1000 | 20 | 20 | 20 | 20 | 20 | 20 |
| | Matting agent (B) | Hydroxyl group-containing polymer (1-1) | 9 | 9 | 9 | 9 | 9 | 9 |
| | Acrylic resin (C) | METABLEN P551A | 2 | 5 | 2 | 5 | 2 | 5 |
| Acrylic resin layer (Y) [parts] | | Acrylic resin composition (y-1) | 100 | 100 | — | — | — | — |
| | | Acrylic resin composition (y-4) | | | 100 | 100 | — | — |
| | | Acrylic resin composition (y-5) | | | — | — | 100 | 100 |
| Thickness of fluorine-based resin layer (X) [µm] | | | 5 | 5 | 5 | 5 | 5 | 5 |
| Thickness of acrylic resin layer (Y) [µm] | | | 45 | 45 | 45 | 45 | 45 | 45 |
| Resin characteristics | Swell ratio | | 1.61 | 1.59 | 1.61 | 1.59 | 1.61 | 1.59 |
| | $MFR_{A+C}$ [g/10 min] | | 14.86 | 11.58 | 14.86 | 11.58 | 14.86 | 11.58 |
| | $MFR_B$ [g/10 min] | | 1.30 | 1.30 | 1.30 | 1.30 | 1.30 | 1.30 |
| | $MFR_{A+C}-MFR_B$ [g/10 min] | | 13.6 | 10.3 | 13.6 | 10.3 | 13.6 | 10.3 |
| Optical characteristics | Total light beam transmittance [%] | | 93.7 | 93.3 | 94.9 | 93.4 | 93.4 | 94.2 |
| | Haze [%] | | 55.2 | 46.2 | 75.7 | 54.4 | 57.0 | 69.0 |
| | 60-degree surface gloss [%] | | 14.9 | 19.5 | 11.2 | 13.9 | 12.7 | 11.1 |
| Die build-up adherence | | | ○ | ○ | ○ | ○ | ○ | ○ |
| Chemical resistance | Methyl ethyl ketone | | ○ | ○ | ○ | ○ | ○ | ○ |
| | 10% Lactic acid | | ○ | ○ | ○ | ○ | ○ | ○ |
| ΔW between before and after stretching | | | 8.4 | 7.9 | 3.8 | 2.1 | 3.1 | 2.3 |

The following was clarified by the above-mentioned Examples and Comparative Examples.

The resin composition of the present invention has a swell ratio as measured under the conditions of a measurement temperature of 230° C., an ambient temperature of 23° C., and a shear rate of 96 (1/sec) of 0.90 to 2.00 and is a composition in which generation of die build-up at the time of producing the fluorine-based film is prevented or suppressed, and process stability, fine-texture matting properties, transparency, chemical resistance, and stress whitening resistance are excellent.

In Table 4, ΔWs between before and after stretching of the laminated films of Examples 16 to 19 are lower than those of Examples 1 and 2. This is because the rubber-containing polymers used in Examples 16 to 19 have higher contents of grafting crossing agent units than the rubber-containing polymers used in Examples 1 and 2 so that the crosslinking between the layers in the rubber-containing polymers becomes more stable, and thus the stress whitening resistance of the laminated films is suitably developed.

INDUSTRIAL APPLICABILITY

As described above, the matte film, the laminated film, the decorative film, the laminated sheet, and the laminated molded product produced from the resin composition of the present invention are particularly suitable for applications in vehicles and applications in building materials. Specific examples for which they can be suitably used include automotive interior applications such as instrument panels, console boxes, meter covers, door lock bezels, steering wheels, power window switch bases, center clusters, and dashboards; automotive exterior applications such as weather strips, bumpers, bumper guards, side mud guards, body panels, spoilers, front grilles, strut mounts, wheel caps, center pillars, door mirrors, center ornaments, side moldings, door moldings, window moldings, windows, headlamp covers, tail lamp covers, and windshield parts; applications such as front panels, buttons, emblems, and surface decorative materials of AV equipment and furniture products; applications such as housings, display windows, and buttons of mobile phones, etc.; and further, furniture exterior materials applications; interior applications for buildings such as walls, ceilings, and floors; exterior applications for buildings such as outer walls (for example, sidings), fences, roofs, gates, and bargeboards; surface decorative material applications for furniture such as window frames, doors, handrails, sills, and lintels; optical component applications such as various displays, lenses, mirrors, goggles, and window glasses; or interior/exterior applications for various transports other than automobiles such as trains, aircrafts, and ships; various packaging containers and materials such as bottles, cosmetic containers, accessory containers; and various other applications such as miscellaneous goods, e.g. prizes and small articles.

The invention claimed is:

1. A resin composition comprising:
    40 to 99% by mass of a fluorine-based resin (A);
    1 to 60% by mass of a matting agent (B), and
    an acrylic resin (C) having a mass-average molecular weight of 500,000 to 5,000,000,
    wherein a swell ratio as measured under the conditions of a measurement temperature of 230° C., an ambient temperature of 23° C., and a shear rate of 96 (1/sec) is 0.90 to 2.00.

2. The resin composition according to claim 1, wherein a content of the acrylic resin (C) is 0.1 to 40 parts by mass with respect to a total of 100 parts by mass of the fluorine-based resin (A) and the matting agent (B).

3. The resin composition according to claim 2, wherein the mass-average molecular weight of the acrylic resin (C) is 1,000,000 to 4,000,000.

4. The resin composition according to claim 2, wherein the acrylic resin (C) is a polymer not containing a hydroxyl group.

5. The resin composition according to claim 2, wherein a MFR ($MFR_{A+C}$) of a melt-kneaded product of the fluorine-based resin (A) and the acrylic resin (C) and a MFR ($MFR_B$) of the matting agent (B) as measured under the conditions of a temperature of 230° C. and a load of 49 N satisfy the following Expression (1)

$$MFR_{A+C} - MFR_B \leq 15.0 \text{ g/10 min} \quad \text{Expression (1)}.$$

6. The resin composition according to claim 1, wherein the fluorine-based resin (A) is polyvinylidene fluoride.

7. The resin composition according to claim 1, wherein the fluorine-based resin (A) comprises a fluorine-based resin (A1) having a MFR as measured under the conditions of a temperature of 230° C. and a load of 49 N of 15 to 30 g/10 min, and a fluorine-based resin (A2) having a MFR as measured under the same conditions of 1.0 to 14 g/10 min.

8. The resin composition according to claim 1, wherein the matting agent (B) is an acrylic matting agent (D).

9. The resin composition according to claim 8, wherein the acrylic matting agent (D) is a polymer containing a hydroxyl group.

10. A fluorine-based film comprising the resin composition according to claim 1.

11. The fluorine-based film according to claim 10, wherein a 60-degree surface gloss of the fluorine-based film is 5 to 70%.

12. A fluorine-based laminated film, wherein the fluorine-containing film according to claim 10 and an acrylic resin layer (Y) are laminated.

13. The fluorine-based laminated film according to claim 12, wherein when an initial distance between chucks is set to 25 mm and a test piece is stretched by 10 mm to an end distance between chucks of 35 mm at a tensile speed of 500 mm/min and a temperature of 0° C. in accordance with ISO 527-3, a difference in whiteness ΔW of the test piece between before and after stretching is 10 or less.

14. The fluorine-based laminated film according to claim 12, wherein a thickness of the fluorine-based film (X) is 1 to 50 μm.

15. The fluorine-based laminated film according to claim 12 comprising a pattern layer on at least one surface.

16. A fluorine-based laminated molded body, wherein the fluorine-based laminated film according to claim 12 is further laminated on a substrate.

17. The resin composition according to claim 1, wherein the mass-average molecular weight of the acrylic resin (C) is 1,000,000 to 3,500,000.

18. The resin composition according to claim 1, wherein a content of the acrylic resin (C) is 1 to 15 parts by mass with respect to a total of 100 parts by mass of the fluorine-based resin (A) and the matting agent (B).

19. A resin composition comprising:
  40 to 99% by mass of a fluorine-based resin (A); and
  1 to 60% by mass of a matting agent (B),
  wherein a swell ratio as measured under the conditions of a measurement temperature of 230° C., an ambient temperature of 23° C., and a shear rate of 96 (1/sec) is 0.90 to 2.00, and
  wherein the fluorine-based resin (A) comprises a fluorine-based resin (A1) having a MFR as measured under the conditions of a temperature of 230° C. and a load of 49 N of 15 to 30 g/10 min, and a fluorine-based resin (A2) having a MFR as measured under the same conditions of 1.0 to 14 g/10 min.

20. A fluorine-based film comprising the resin composition according to claim 19.

21. A fluorine-based laminated film, wherein the fluorine-containing film according to claim 19 and an acrylic resin layer (Y) are laminated.

22. A fluorine-based laminated molded body, wherein the fluorine-based laminated film according to claim 21 is further laminated on a substrate.

* * * * *